No. 691,787. Patented Jan. 28, 1902.
W. A. LORENZ.
ROASTING FURNACE.
(Application filed July 8, 1901.)
(No Model.) 2 Sheets—Sheet 2.
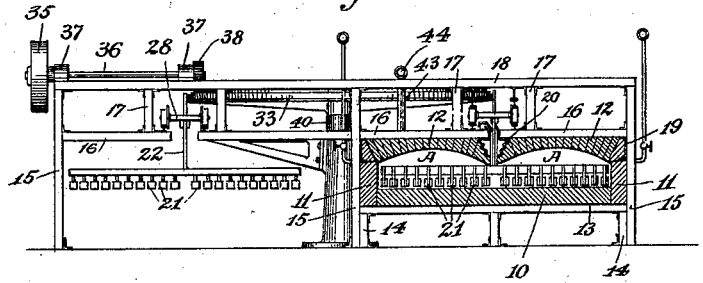
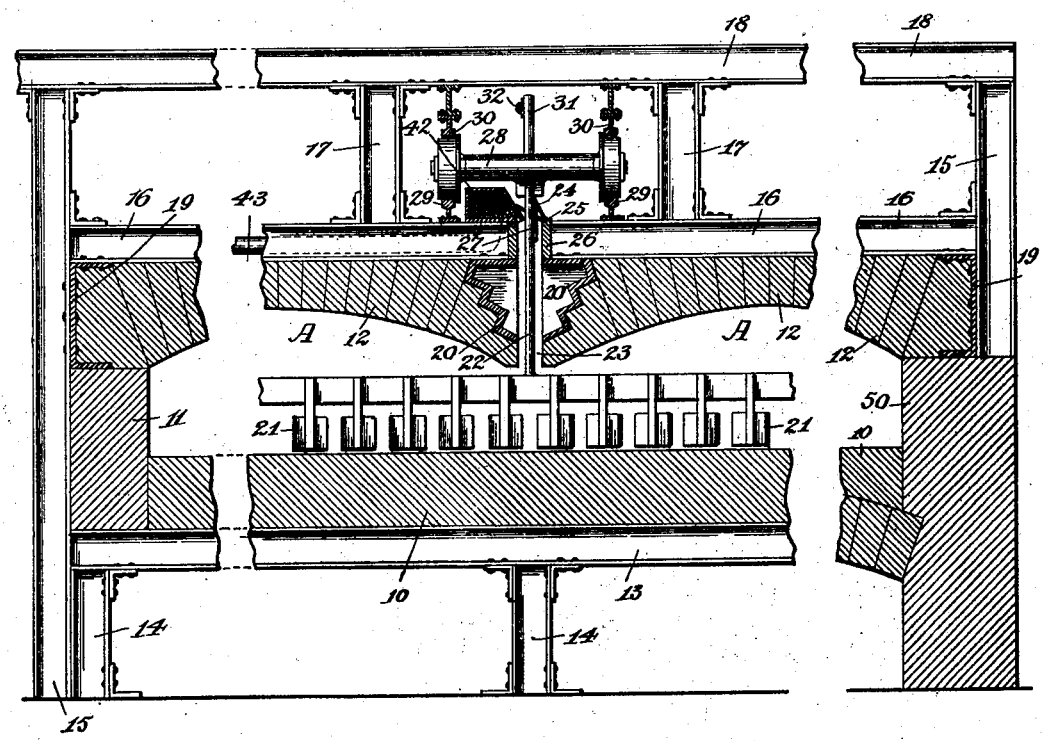
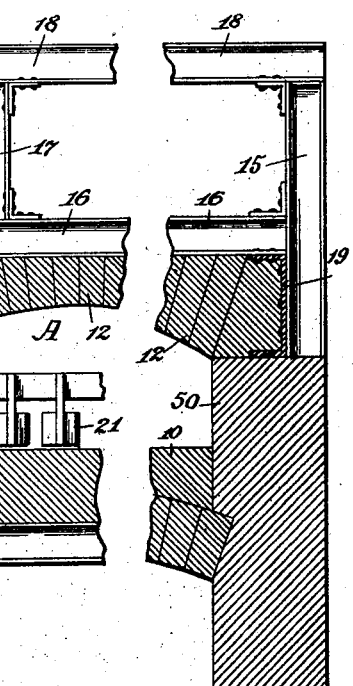
Witnesses: Inventor:
William A. Lorenz.

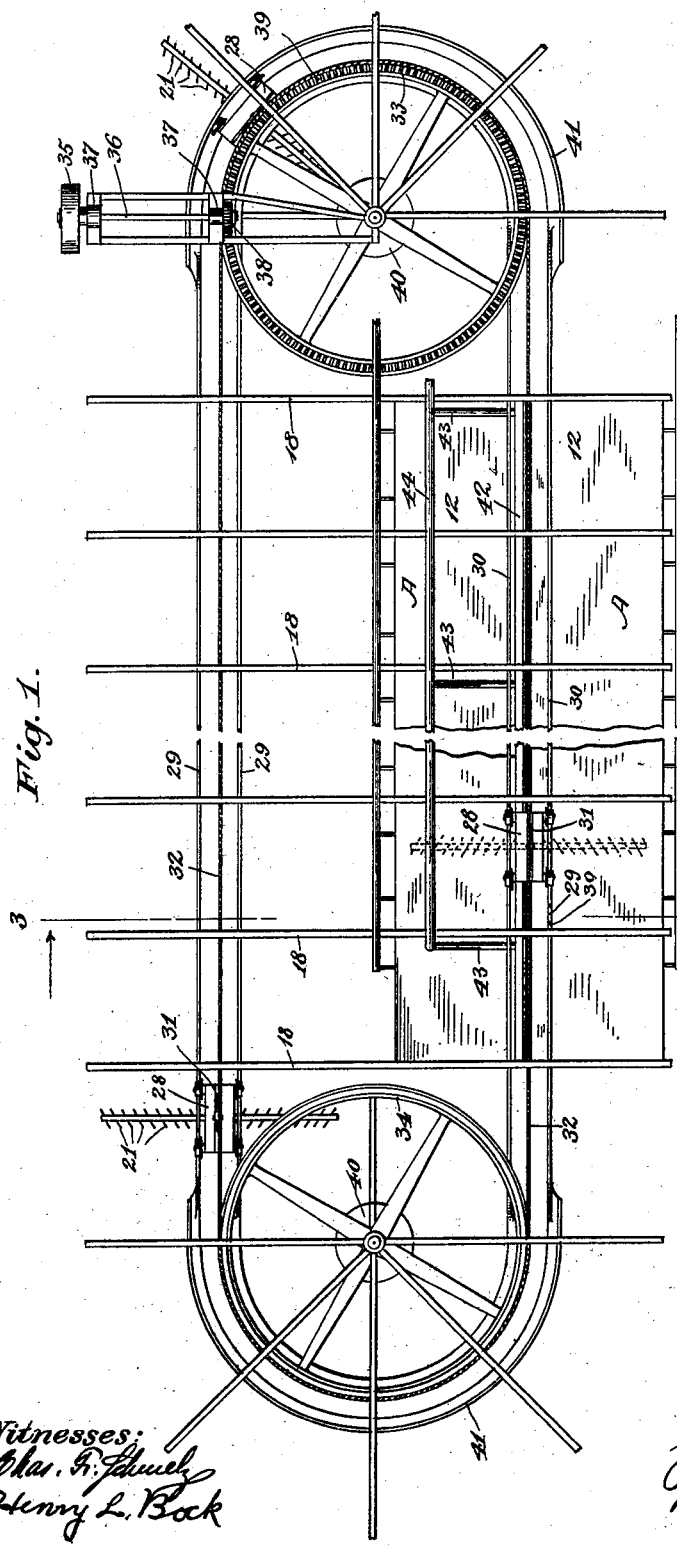

UNITED STATES PATENT OFFICE.

WILLIAM A. LORENZ, OF HARTFORD, CONNECTICUT, ASSIGNOR TO LANYON ZINC COMPANY, OF ST. LOUIS, MISSOURI, A CORPORATION OF NEW JERSEY.

ROASTING-FURNACE.

SPECIFICATION forming part of Letters Patent No. 691,787, dated January 28, 1902.

Application filed July 8, 1901. Serial No. 67,393. (No model.)

*To all whom it may concern:*

Be it known that I, WILLIAM A. LORENZ, a citizen of the United States of America, and a resident of Hartford, in the county of Hartford and State of Connecticut, have invented certain new and useful Improvements in Roasting-Furnaces, of which the following is a specification.

This invention relates to ore-roasting furnaces, and has for one of its objects an improved construction of the structural work of the furnace, the roof of which is made in sections, each of which is individually supported by cross-beams, which in turn may be supported by the walls or by vertical posts or standards, the latter being adapted to serve at the same time as a means for bracing or stiffening the side walls of the furnace.

My invention has, furthermore, for its object the provision, in combination with a roasting-furnace having a hearth substantially as above described, of a stirrer mechanism the operating-arm of which projects through a longitudinal slot formed in the roof and in communication with the interior of the hearth, near the floor thereof, so that heat and draft in the hearth may be concentrated near the higher portion of the roof.

My invention has, furthermore, for its object the provision of means whereby the escape of heat from the hearth through the slot may be prevented, these means consisting, substantially, of an air-supply whereby the upward tendency of the heat to escape through the slot may not only be counteracted, but whereby, furthermore, air may be supplied to the interior of the hearth to increase the combustion.

In the accompanying drawings, in which similar characters denote similar parts, Figure 1 represents a top view of a furnace built in accordance with my invention. Fig. 2 is a side view thereof. Fig. 3 is a section on line 3 3, Fig. 1. Fig. 4 is a section of a portion of a furnace and on an enlarged scale, illustrating in detail some of the features of my invention; and Fig. 5 is a modification of the roof-supporting structure, as will be hereinafter described.

As has above been stated, my invention relates particularly to ore-roasting furnaces in which metal ores in more or less granulated form are subjected to the action of heat, to be calcined thereby.

The ore-roasting furnace forming the subject of my present invention and illustrated in the accompanying drawings comprises a hearth A A, having a floor 10, side walls 11, and roof 12, the latter being made in multiple-arch form or in sections, each of which has the form of an arch, as is clearly shown in Fig. 3. These arches are disposed longitudinally of the hearth, the lowest portions of these arches at their outer edges resting upon the sides of the hearth. At their inner edges they nearly meet at the longitudinal center of the hearth. The intermediate higher portions of the arches are remote from the longitudinal central portion of the hearth. At these higher portions the greatest amount of heat concentrates, and the products of combustion rise at these centers and move longitudinally of the hearth. The hearth of the furnace is supported in the present instance by a plurality of horizontal and laterally-disposed I-beams 13, which in turn rest upon uprights 14, while the side walls 11 may be braced or stiffened by a series of vertical posts or standards 15, so that in the construction shown the furnace is entirely surrounded by the open air.

Means are provided whereby the roof 12 may be supported and the strain inherent to the formation of the arches may be entirely removed from the side walls in such a manner that the arches or sections of which the roof is composed are practically suspended from above, these means consisting, substantially, of horizontal or cross beams 16, resting with their outer ends upon the side walls 11, while near their inner ends they are attached to vertical members 17, which in turn are secured to horizontal beams or girders 18, resting upon the posts or standards 15 above mentioned.

Inasmuch as the construction of the arches will as a matter of course tend to throw a greater or less strain upon the end portions thereof, I provide near the outer ends of said arches channel-irons, such as 19, which are firmly secured to the cross-beams 16, while near their junction key members 20 are also rigidly secured, so that in this manner each roof-section is supported independently from the cross-beam 16, leaving a space between the members 20.

In Fig. 5 I have illustrated a modification of a roof-supporting structure, which in this instance shows the vertical post or standard 15 resting upon a suitable foundation 50, which may be either a wall running the entire length of the furnace or which, below the floor of the hearth, may be in the form of piers. In this instance the roof 12 is entirely supported and carried by a framework comprising the beams 15, 16, 17, and 18 and merely rests upon the side walls 50, while by virtue of this construction each of the arches is supported independently of the other, the side thrust thereof being taken by the member 20 and at its opposite end by the channel-beam 19, both of which are firmly secured to the cross-beam 16, as above described. It will now be seen that if the horizontal beam 18 extends across the furnace and rests on the uprights 15 and that if the cross-beam 16 in turn is supported from the horizontal beam 18 by the intervention of the member 17 and also from the upright 15 the entire roof formation will not only be very strong, but will also be self-contained and adapted to be built up independently of the furnace, upon which it may be placed after completion and may readily be removed therefrom when required.

Suitable devices may be employed in connection with this furnace for stirring the ore within the hearth A at predetermined periods, these devices consisting in the present instance of rabbles 21, adapted for movement through the hearth A longitudinally thereof and operated in the construction shown by an arm 22, projecting through the roof 12, which for this reason is provided with a slot 23, extending the entire length of the furnace and communicating with the interior of the hearth near the lowest point of said arches, so that the heat in the hearth may concentrate near the upper portions of said roof and at a point remote from the lower opening of the slot 23. In this manner the liability of the escape of heat from the hearth through the slot will be reduced to a minimum, and inasmuch as the slot 23 is located near the junction of a pair of adjacent arches the key member 20 above referred to is made in two parts, each of which is secured to its particular cross-beam 16.

Means are provided whereby the slot 23 may be normally closed, so as to prevent gases and heat from rising and escaping from the hearth, such means consisting of gates 24, pivoted, as at 25, on the longitudinally-disposed bars 26 and adapted to be engaged and raised to permit the passage of the rabble-arm 22 by a cam-bar 27, secured to one side of the rabble-arm 22, so that as said rabble-arm passes through the slot 23 the gates 24 will be successively operated to permit the passage of the arm 22, after which they will return to their normal position.

The rabble-arm 22 is herein shown secured to a truck 28, the wheels of which travel on rails 29, which are laid upon the upper sides of the cross-beams 16 or may be otherwise suspended from the girder 18, while guard-rails, such as 30, may be disposed above the truck-wheels to insure the proper operation of the device, said guard-rails being mounted on the under side of the horizontal beams 18, above referred to. The truck 28 is provided with an extension 31, to which a suitable actuator may be secured for causing said truck to travel along on the tracks 29, this actuator being herein shown as a cable 32, passing around suitable wheels 33 and 34, the latter of which serves as an idler, while the wheel 33 may constitute the driving member of the mechanism, both wheels 33 and 34 being mounted for rotation on suitable columns or standards 40.

Any suitable means may be employed for imparting movement to the wheel 33, the mechanism shown in the drawings comprising a belt-pulley 35, mounted upon a shaft 36, which is journaled in bearings 37 and carries at one end a pinion 38 in engagement with gear-teeth 39, which are provided on the upper surface of the wheel 33.

When the truck 28 is about to be turned in an arc around the axis of the wheels 33 and 34, the truck-wheels will leave the tracks 29, and the trucks may then be guided in the proper manner by guard rails or flanges 41 until said trucks are in position to again advance in a straight line.

By referring to Fig. 1, it will be seen that the movement of the trucks is such as to cause the rabble-arms to traverse the furnace longitudinally and that when said rabbles have left the hearth they will return to their reëntering point after passing around the outside of the furnace, and will therefore be cooled down before again entering the furnace.

In order more effectively to guard against the loss of heat and passage of the fumes through the slot 23, I provide in communication with said slot an air-supply conduit, shown herein as an air-box 42, extending the entire length of the furnace and so organized as to direct a draft of air downwardly into the slot 23, so that all tendency for the heat to rise through the slot may be counteracted by said draft, while, on the other hand, air may be supplied from this source to the interior of the hearth to any desired amount. The air is supplied to the box 42 through a series of pipes 43, connected with the main supply-pipe 44, and the air or other gaseous fluid may be heated as required before entering the furnace.

It is evident that the construction of my improved furnace may be varied in many particulars from that shown and described without departing from the spirit of my invention, and I wish it to be distinctly understood that I do not confine myself to the particular form of the several elements shown in the accompanying drawings, as these modifications are obviously within the scope of my invention as claimed.

Having described my invention, what I claim as new, and desire to secure by Letters Patent, is—

1. A roasting-furnace comprising a hearth, the roof of which is formed of sections which are separated from each other by a slot disposed longitudinally of said roof, and the adjacent portions of which are substantially in alinement with said slot and are nearer to the floor of the hearth than the central portion of said sections.

2. The combination with a hearth having two arches disposed longitudinally of the roof thereof; a longitudinal opening through the roof between the said arches and adjacent to their inner lower edges; a stirrer mechanism having an arm projecting through said opening; and means for moving said stirrer longitudinally through said hearth.

3. The combination, with a roasting-furnace comprising a hearth the roof of which has a continuous longitudinal slot disposed lengthwise of the hearth; of means for forcing air through said slot into the hearth.

4. The combination, with a roasting-furnace comprising a hearth the roof of which has a longitudinal slot; of a longitudinally-disposed air-conduit adjacent to the slot for forcing air into said slot; and means for normally closing said slot.

5. The combination, with a roasting-furnace comprising a hearth, the roof of which is provided with a longitudinal slot; of a stirrer mechanism having an arm projecting through said slot; means for moving said stirrer mechanism longitudinally of the hearth; means for normally closing said slot, and operable to permit the passage of the stirrer-arm through said slot; and an air-conduit disposed in parallelism with the slot for forcing air thereinto.

6. An ore-roasting furnace comprising a roof formed of a plurality of sections which are separated from each other by an opening extending longitudinally of said roof; a supporting member disposed above each of the roof-sections; means for independently supporting each of said roof-sections from said member; a girder for sustaining the supporting member near the ends thereof; a stirrer mechanism having an arm projecting through said opening into the hearth; and means for moving said mechanism longitudinally of the hearth.

7. A roasting-furnace comprising a roof made in sections separated from each other by a longitudinal slot; cross-beams disposed above said sections; thrust members secured to said cross-beams and for supporting the roof-section; girders extending laterally across the furnace; means for supporting the sectional cross-beams from the girders; a stirrer mechanism having an arm projecting through said slot into the hearth; and means for moving said mechanism longitudinally of the hearth.

8. An ore-roasting furnace comprising a roof composed of a plurality of arches which are separated from each other by a slot extending longitudinally of the furnace; I-beams disposed above each of said sections; thrust members secured to said beams, for independently supporting each of said sections from said beams; girders extending laterally of the furnace; means for supporting the I-beams from the girders; means for supporting the girders near the ends thereof; a stirrer mechanism having an arm projecting through said slot into the hearth; and means for moving said mechanism longitudinally of the hearth.

Signed at Hartford, Connecticut, this 5th day of July, 1901.

WILLIAM A. LORENZ.

Witnesses:
N. PHOENIX,
WM. H. HONISS.